United States Patent
Gorny et al.

(10) Patent No.: US 10,012,895 B2
(45) Date of Patent: Jul. 3, 2018

(54) HIGH PERFORMANCE SCREENS FOR LASER PROJECTION

(71) Applicant: DOLBY LABORATORIES LICENSING CORPORATION, San Francisco, CA (US)

(72) Inventors: Douglas J Gorny, Pacifica, CA (US); Martin J Richards, Redwood City, CA (US); Timo Kunkel, Kensington, CA (US); David Lloyd Schnuelle, Pasadena, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 15/118,371

(22) PCT Filed: Mar. 10, 2015

(86) PCT No.: PCT/US2015/019775
§ 371 (c)(1),
(2) Date: Aug. 11, 2016

(87) PCT Pub. No.: WO2015/138503
PCT Pub. Date: Sep. 17, 2015

(65) Prior Publication Data
US 2017/0176846 A1    Jun. 22, 2017

Related U.S. Application Data

(60) Provisional application No. 61/950,521, filed on Mar. 10, 2014.

(51) Int. Cl.
*G03B 21/60* (2014.01)

(52) U.S. Cl.
CPC .................................. *G03B 21/60* (2013.01)

(58) Field of Classification Search
CPC ...... G03B 21/56; G03B 21/60; G03B 21/602; G02B 5/0231
(Continued)

(56) References Cited

U.S. PATENT DOCUMENTS

| 1,122,192 A | 12/1914 | Clark |
| 1,535,985 A | 4/1925 | Clark |

(Continued)

FOREIGN PATENT DOCUMENTS

| CN | 102955348 | 3/2013 |
| EP | 0825480 | 2/1998 |

(Continued)

OTHER PUBLICATIONS https://en.wikipedia.org/wiki/Gel#Hydrogels.
https://en.wikipedia.org/wiki/Aerogel.

*Primary Examiner* — Christopher Mahoney (57) ABSTRACT

The present invention provides a cinema screen that improves audience perception of brightness at, for example, a premium theater without additional illumination cost. The screen is produced from materials that also help mitigate speckle from laser illumination. The screen has properties and includes structures that may be tuned to the specific capabilities of the projection system, arrangement of the theater, and projector (and angle of projection, angle of viewing). Light reflected from the screen are direct toward audience members and away from walls and ceilings.

4 Claims, 6 Drawing Sheets

(58) Field of Classification Search
USPC .................................. 359/459, 449, 741–742
See application file for complete search history.

(56) References Cited

U.S. PATENT DOCUMENTS

| | | | |
|---|---|---|---|
| 4,057,323 A | | 11/1977 | Ward, Jr. |
| 4,089,587 A | | 5/1978 | Schudel |
| 5,696,625 A | | 12/1997 | Malifaud |
| 6,151,162 A | * | 11/2000 | Van De Ven ........ G03B 21/625 359/443 |
| 6,574,041 B1 | | 6/2003 | Chen |
| 6,724,535 B1 | * | 4/2004 | Clabburn ............. G02B 3/0087 349/111 |
| 7,139,123 B2 | | 11/2006 | Chubachi |
| 7,499,214 B2 | | 3/2009 | Novet |
| 7,583,437 B2 | | 9/2009 | Lipton |
| 7,649,687 B2 | | 1/2010 | Shimoda |
| 7,826,135 B2 | | 11/2010 | Destain |
| 7,898,734 B2 | | 3/2011 | Coleman |
| 8,014,066 B2 | | 9/2011 | Teather |
| 8,395,841 B2 | | 3/2013 | Choi |
| 2004/0233524 A1 | | 11/2004 | Lippey |
| 2005/0141087 A1 | * | 6/2005 | Yoshida ............... G03B 21/625 359/457 |
| 2008/0094705 A1 | | 4/2008 | Burkum |
| 2008/0297895 A1 | * | 12/2008 | Fujita .................... G03B 21/60 359/459 |
| 2009/0190210 A1 | | 7/2009 | Coleman |

FOREIGN PATENT DOCUMENTS

| | | |
|---|---|---|
| WO | 2007/067688 | 6/2007 |
| WO | 2015/036501 | 3/2015 |

* cited by examiner

HIGH PERFORMANCE SCREENS FOR LASER PROJECTION

CROSS-REFERENCE TO RELATED APPLICATIONS

This application claims the benefit of priority to U.S. Provisional Patent Application No. 61/950,521 filed 10 Mar. 2014, which is hereby incorporated by reference in its entirety.

BACKGROUND OF THE INVENTION

Field of Invention

The present invention relates to screens and other imaging devices used to display images, and more particularly to cinema screens. The invention is yet further related to screen characteristics and structures that efficiently reflect and direct projected images to an audience while minimizing introduction of ambient light, and reducing visual artifacts such as speckle when such projections are made via laser based projection devices.

Discussion of Background

Cinema projection typically utilizes screens to display projected images to viewers in an audience. It is currently a trend to provide larger screens at premium theaters.

SUMMARY OF THE INVENTION

The present inventors have realized that the next generation of cinema is about high dynamic range, wide color gamut and high brightness that match or approach the capabilities of the Human Visual System (HVS). Images having such qualities are known as Visual Dynamic Range, or VDR, images. The present invention provides a high performance screen that complements the use of high performance laser projectors and helps enable VDR imaging in an effective and efficient manner, particular in the premium commercial theater and motion picture cinema settings.

In various embodiments, the present invention provides specifications, structures, and equipment (including screens) that may be utilized individually or in combination to produce high brightness, high dynamic range, and wide color gamut images.

In various embodiments, the present invention provides a cinema screen that improves audience perception of brightness at, for example, a premium theater without additional illumination cost. The screen is produced from materials that also help mitigate speckle from laser illumination. The screen has properties and includes structures that may be tuned to a specific capability of the projection system, arrangement of the theater, and/or projector. For example, in a stadium seating theater with an above top row projector.

In one embodiment, the present invention provides a screen having a physical structure that directs reflected light from the screen to audience members in a manner that minimizes light reflected toward structures of the auditorium or theater. The projected image is reflected in directions that evenly distributes light from the projected image to all audience members (or at least a majority of audience members).

In various embodiments, the structures of the screen are arranged so that reflections from the screen (i.e., the image being displayed on the screen) are directed to audience members and reduce the amount of light reaching theater structures such as sidewalls, ceilings, etc., thereby increasing brightness of images presented to the audience and preventing some image light from contributing to ambient lighting in the theater and reducing contrast on the screen.

In various embodiments, the structures on the screen comprise various coatings comprising one or more of, for example, diffusing materials, reflectors, polarizers, prisms, spherical structures, beads, liquid encapsulated beads, crystals, liquid crystals, micro-dots, quantum dots, materials exhibiting Brownian motion, materials that are flexible and react (move) to vibrations such as high frequency sound or physical vibrations, materials that exhibit random motion when vibrated introduced to sonic waves, polarization preserving materials.

The structures on the screen are generally of a size smaller than a pixel displayed on the screen. For example, the structures may be any of just less than a pixel size, ½ a pixel, ¼ of a pixel, or an order of magnitude or more smaller than a pixel size. All other factors being equal, a screen showing a 4 k or 8 k images would have structures that are respectively 2× or 4× smaller than the structures on a screen showing 2 k images. For compatibility across all typical images 2 k-8 k, smaller structures sizes are more desirable.

The various structures may be etched or embossed onto a screen material. The various materials or coatings may include structures randomly mixed into a clear or translucent medium such as, for example, paint, acrylic, or epoxy, and sprayed onto a screen substrate. Such substrates may be, for example, plastic, PVC, polymers. The substrate may have, for example, a high modulus. The structures may be etched into or printed onto a substrate via a Computer Numerical Controlled (CNC) machine, such as a large sized CNC routing table with a fine cutting or printing instrument. Small sized (e.g., micro) 3D printing may be utilized to produce the structures.

The present invention includes construction of a screen and/or printing of structures on the screen on location (e.g., at a theater in which the screen is, or is to be installed).

Figure 3:
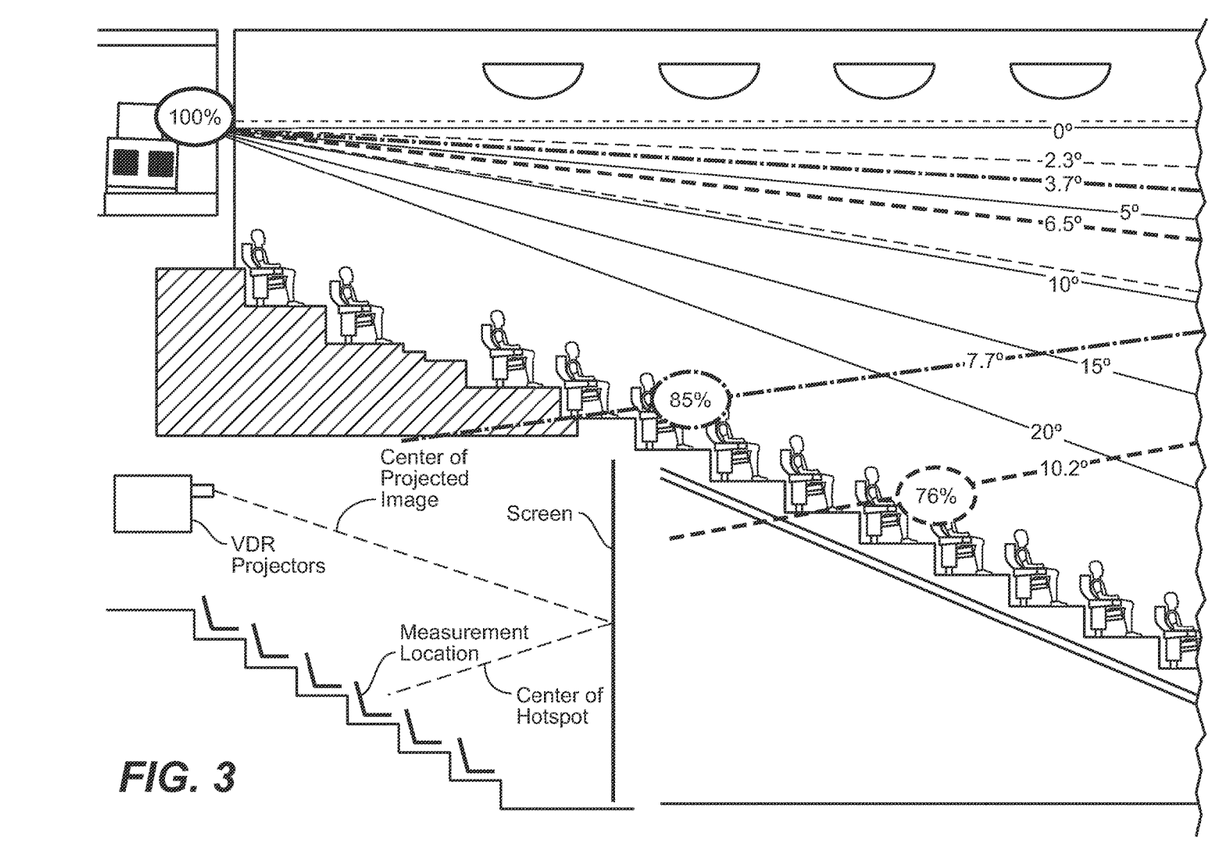
FIG. 3 is a drawing illustrating effects of down angled projection on perceived brightness.
Figure 7:
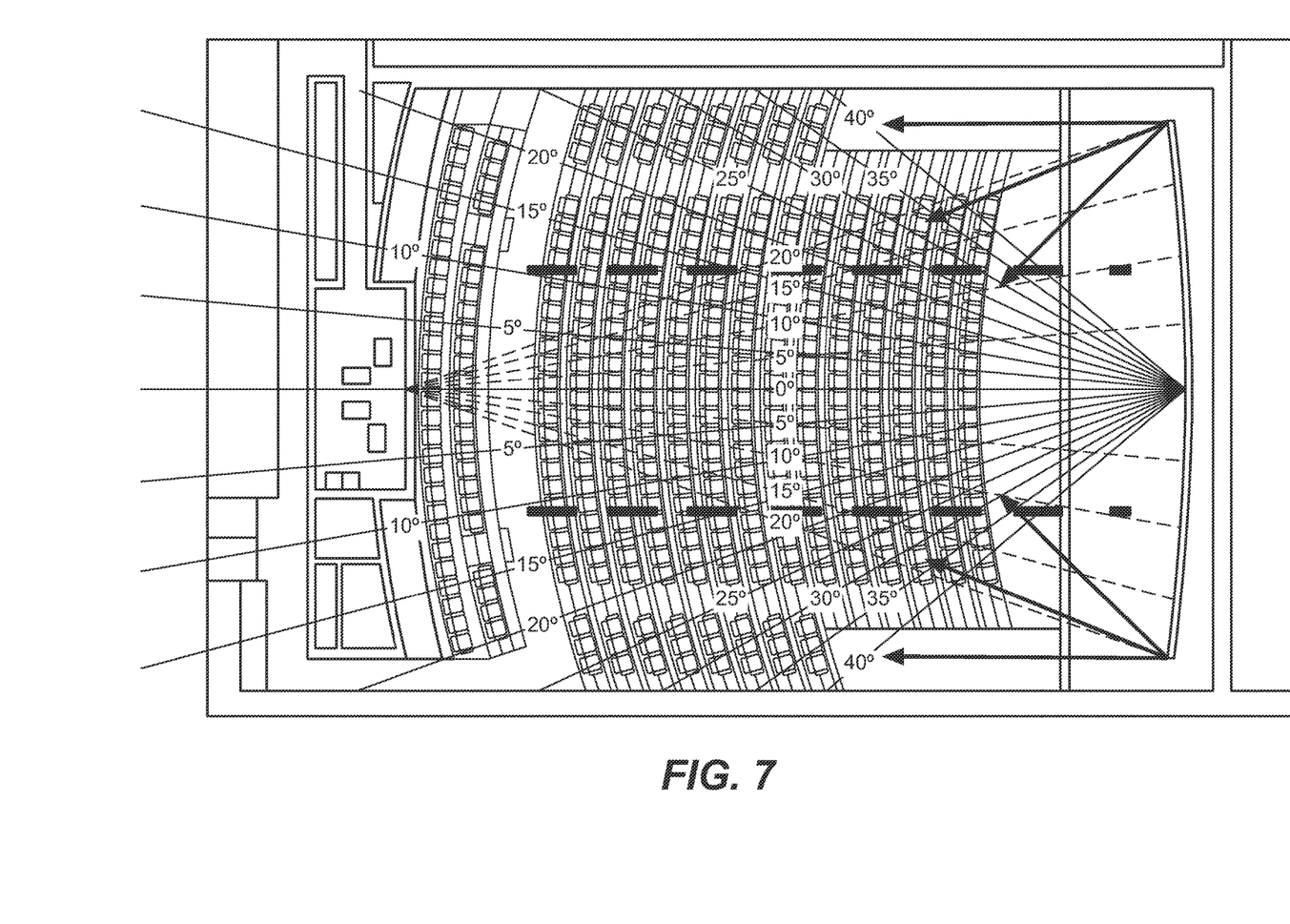
FIG. 7 is a top view of a theater illustrating reflective angles at central and side areas with structures corresponding to the screen curvature.

In various embodiments, an orientation of the structures is changed based on a location or area of the screen. In one embodiment, the orientations are varied across the screen. The orientation variations of the structures are related to the illumination pattern projected onto the screen not caused by the image to be displayed. The illumination pattern is an angular pattern related to the geometries of the auditorium, projector(s) placement, screen location and audience position, i.e., the direction of illumination variation across the screen. An exemplary illumination pattern is shown in FIGS. 3 and 7 (where solid lines show angles of screen to audience, and dashed lines show projector to curved screen). The orientation variations compensate for uneven illumination often observed as, for example, hot spots, and to keep more of the light from the screen on the audience as opposed to side wall, ceilings, and other theater structures.

In various embodiments, the screen may include screen shakers. The screen shakers may be specifically tuned to a frequency that exhibits an increased or maximum motion of particles contained in the screen coating. Such particles may include liquids encapsulated in beads sprayed onto the substrate during construction. Such liquids may include milk or other liquids known or engineered to have Brownian motion. Such liquids may be mixtures such as water with pollen grains or other debris.

In one embodiment, the directed reflected light emphasizes a specific area of the theater for best picture. Such best picture area may be in a central area of the available seating, further minimizing reflections toward structural components of the theater (such as side walls). The present invention includes marketing seating in the best picture area as premium seating (and possibly an associated premium pricing, VIP designation, roomier seats or other upgrades).

The present invention may embodied as a screen set-up to receive a high dynamic range image, such as achieved by next generation dual modulation laser projectors. The present invention includes a method a presenting VDR or near VDR images in a cinema or other settings whereby the image is prepared via a laser projector having one or more of highly collimated light sources illuminating a modulator or a series of modulators producing the images—and projecting the images onto a screen. The screen is, for example, a screen installed in a premium theater with stadium seating. The projector may project from above a top row of the stadium theater at an elevation at or near the highest point of the screen and project in a downward direction. The method includes modifying the normal reflections exhibited from traditional commercially available screens. Structures on the screen modify the reflected light into a more limited range of reflections encompassing the stadium seats while excluding side walls and other theater structures, and, for example, compensating for hotspots and evenly distributing the reflected light across. The structures are oriented or adjusted based at least on part as to the angle of the projector, orientation of the screen relative to the projector, and geometry of the screen (curved, flat, concave, etc.).

In various embodiments, the invention includes adjusting a performance characteristic of the projector for efficiency or brightness based on the capabilities or characteristics of the screen. Such capabilities and characteristics include, for example, coatings and/or screen substrate materials which at least partially define the gain performance of the screen. The structures are developed to take into account the coatings and/or substrate materials to be used.

Portions of the invention and/or methods embodying the invention may be conveniently implemented in programming on a general purpose computer, or networked computers, and the results may be displayed on an output device connected to any of the general purpose, networked computers, or transmitted to a remote device for output or display. Such computers include, for example, cinema servers, high speed data connections, storage devices. Including getting a signal to the projector, DCP files (cinema content) sent using encrypted physical media and encrypted media over satellite, fiber or similar transmission.

In addition, any components of the present invention represented in a computer program, data or image sequences, and/or control signals may be embodied as an electronic signal broadcast (or transmitted) at any frequency in any medium including, but not limited to, wireless broadcasts, and transmissions over copper wire(s), fiber optic cable(s), and co-ax cable(s), etc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The present inventors have realized various issues with today's screens which could be corrected using engineered structured screens made to the correct specification for auditoriums with laser illuminated projection and stadium seating. Speckle needs to be mitigated.

a. Speckle can be prevented by using screens with surface properties which generate less speckle. Surface roughness and the depth to which the light penetrates the surface are large factors in the amount of speckle generated.

b. Speckle can be mitigated by shaking the screen. The screen material and tensioning determine how well the surface disruptions generated by the mechanical shakers distribute across the surface, which in turn drives the number and position of the screen shakers necessary to achieve the desired level of mitigation.

Figure 1:
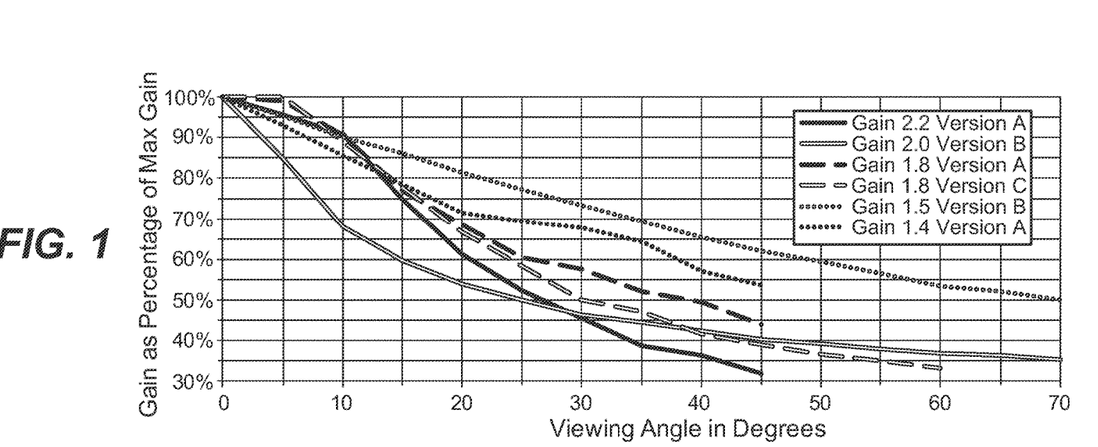
FIG. 1 is a graph of screen gain versus horizontal viewing angle relative to the projected illumination normal.

Referring now to the drawings, wherein like reference numerals designate identical or corresponding parts, and more particularly to FIG. 1 thereof, there is illustrated a graph of screen gain versus horizontal viewing angle relative to the projected illumination normal for a collection of screens. Such measurements are taken with the projected illumination and viewer both vertically normal to the screen. A gain of 1 represents the level which would be reflected from a Lambertian surface.

The projectors in auditoriums with stadium seating are typically located normal to the top of the screen. This means that most of the screen is illuminated at a down angle (i.e. not normal to the screen). Screens with gain are designed to reflect the largest amount light back to the illumination source. Less light is reflected as the observation point is moved off the normal axis of illumination.

Figure 2:
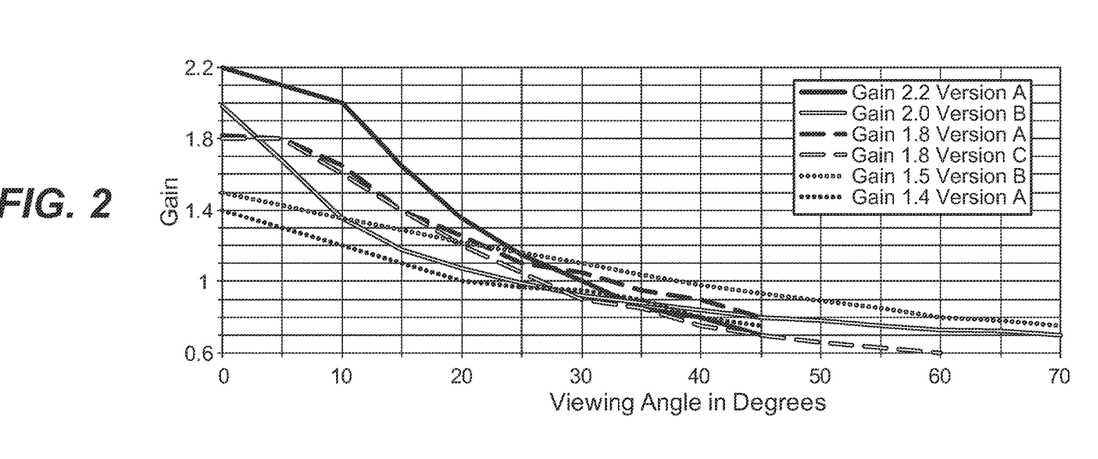
FIG. 2 is a graph illustrating change in horizontal gain when illumination is moved from vertically normal to a screen to an 8 degree down angle.

The assumption made is that the illumination is normal to the screen, which is not the case with down angled projection. FIG. 2 is a graph illustrating change in horizontal gain when illumination is moved from vertically normal to a screen to an 8 degree down angle. FIG. 2 shows the change in the horizontal gain plot when the illumination is moved from vertically normal to the screen to an 8 degree down angle illumination. The blue line below shows the gain with illumination normal to the screen and the green lines shows the gain with illumination at an 8 degree down angle. The purple line shows the gain percentage with illumination normal to the screen and the red line shows the gain percentage with the illumination at an 8 degree down angle.

Most screens used for this application apply a reflective coating to a substrate such as plastic, vinyl, PVC, and/or like material. The reflective coating is what determines the gain performance and the amount of speckle generated. The substrate determines how well the shakers will perform. Since the coating is applied to the relatively smooth uniform surface of the substrate the gain performance is the same up and down the vertical and horizontal viewing axis. In other words the screen performance is the same viewed X degrees in any direction off the normal illumination to the screen.

Engineered structured screens emboss 3D patterns into the substrate. These structures can be built asymmetrically to produce gain performance which varies depending if the viewing angle is horizontal or vertically offset from the illumination normal. Further the structures can be made such that the gain performance varies depending on which side of the normal it is viewed from.

Figure 4:
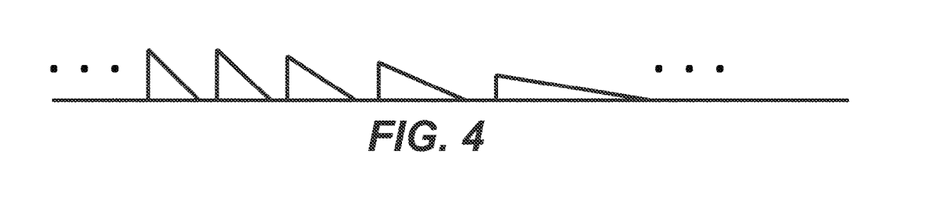
FIG. 4 is an example structure that may be embossed on, etched into, or printed onto a screen substrate.

FIG. 4 is an example structure that may be embossed on, etched into, or printed onto a screen substrate. FIG. 4 includes structures (e.g., triangular) that each have a reflective surface. The off normal surface of each structure in this embodiment is the main reflective surface and directly reflects light from a projector (e.g., cinema projector, laser projector, DLP based projector, dual modulation projector, etc.), and secondary reflections from the normal surface and any reflections from neighboring structures.

As shown in FIG. 4, an inclination of the main reflective surfaces may vary. This illustrates that the main angular reflection from the screen will vary. Such variations occur across the screen, the more steeply angled surfaces placed in areas of the screen when light needs to be reflected or directed to areas other than where a typical reflection would be directed. The more flat areas of the reflective surfaces behave more like typical screen surfaces and will generally reflect back toward the projector or at an angle based with the incident angle of the light being reflected.

As noted above, the amount of inclination and angular reflection (relative to screen normal) will vary. The screen may include, for example, areas having a specific amount of reflectivity and, in most cases, an amount of inclination generally attributed. Preferably, the inclination varies smoothly from one area having a first general amount of inclination to another area having a second amount of inclination. As also shown in FIG. 4, a spacing between structures may vary. For example, spacing between more highly inclined reflecting surfaces may be shorter and increase as the reflecting surfaces become flatter. Preferably, variations in spacing between structures, if varying, will vary smoothly.

The structures shown in FIG. 4 are one dimensional in that they illustrate reflections in one direction, however, across the screen, reflection may be directed in any direction or combination of directions. For example, structures in one area of the screen may reflect mainly in a down direction, and reflectors in another area of the screen may reflect in a another direction (e.g., normal to the screen), and reflectors between these two areas may reflect in increasing amounts between down and normal. Similarly, reflective direction may be across the screen, toward center or from center to edges of the screen. Although illustrated as more simple reflectors, other optics may be utilized, such as prisms, and combined with other elements such as lenses, diffusers, coatings, etc.

Figure 5A:
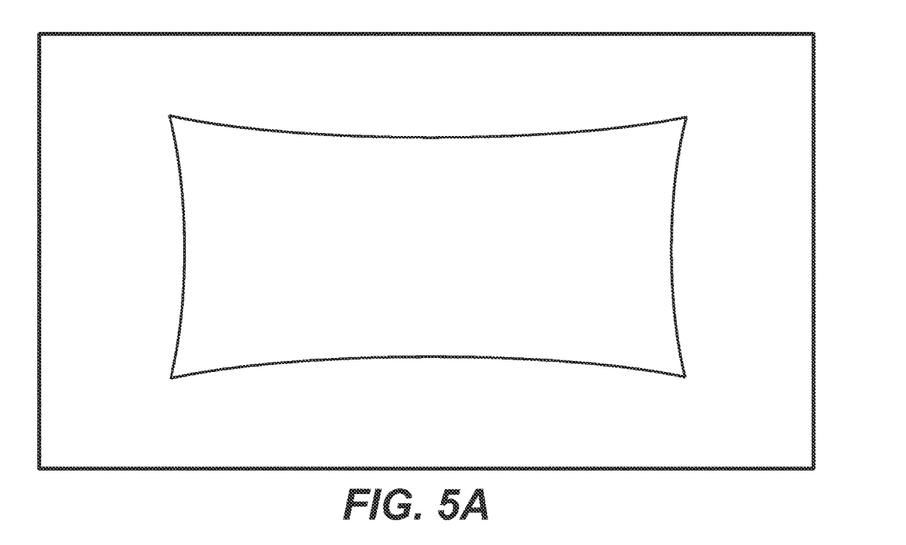
FIGS. 5A, B, C and D are exemplary maps for varying reflectivity of a screen.
Figure 5B:
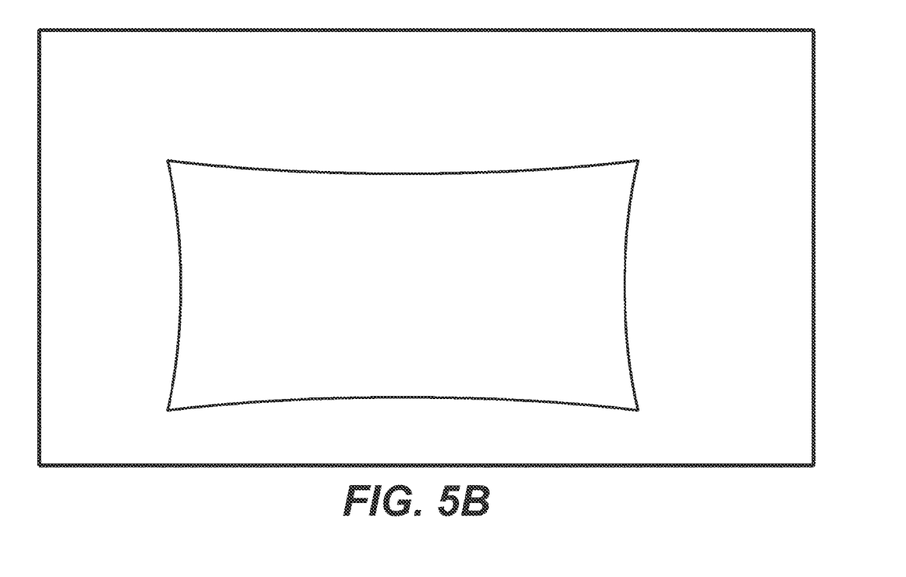
Figure 5C:
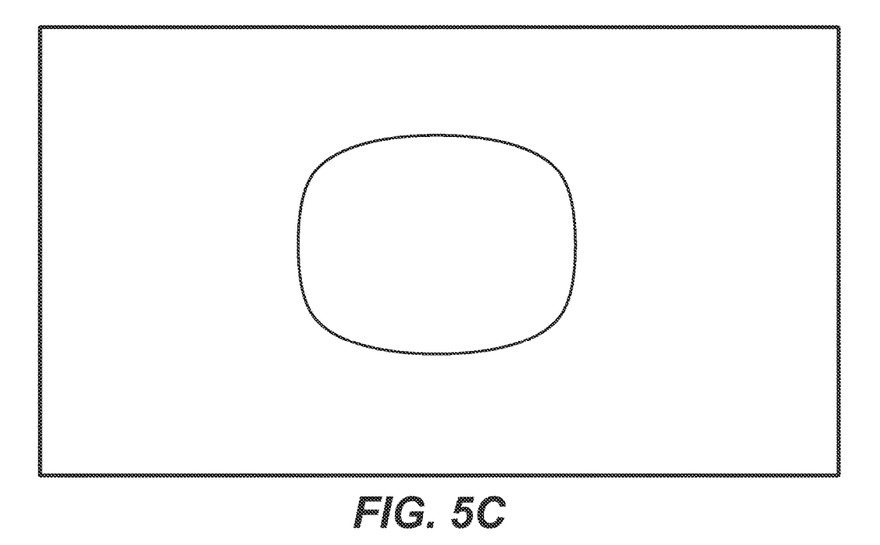
Figure 5D:
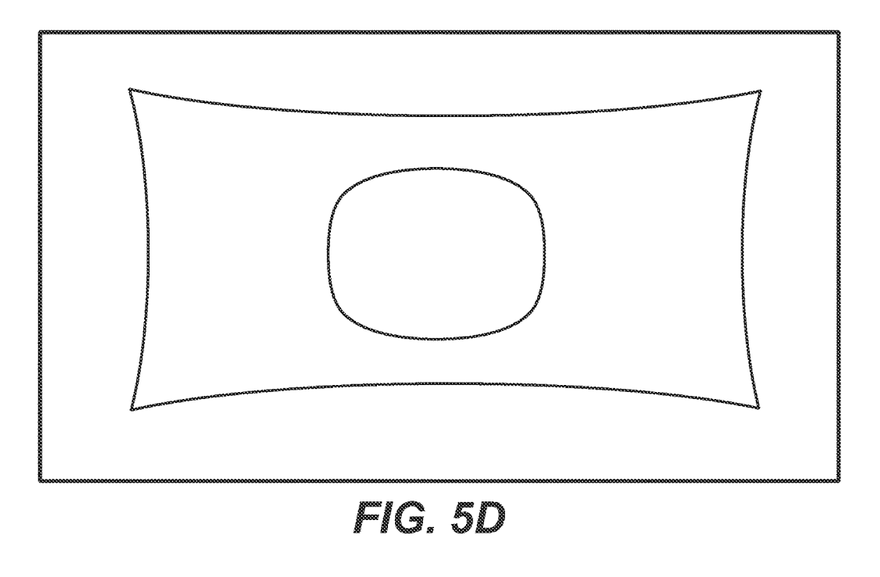

FIG. 5A provides an exemplary map for varying reflectivity of a screen. A top area of the screen mainly has structure mainly reflecting in a down direction; side areas mainly reflect down and toward a center of the screen; and bottom areas of the screen mainly reflect up. FIG. 5B provides an alternative having a larger down reflection area at a top of the screen. FIG. 5C provides an example of a central area of the screen that mainly reflects normal and out toward edges of the screen. FIG. 5D provides an example that combines 5A and 5C.

The structures of the screen are arranged so that reflections from the screen (i.e., the image being displayed on the screen) are directed to audience members and reduce the amount of light reaching theater structures such as sidewalls, ceilings, etc., thereby increasing brightness of images presented to the audience and preventing some image light from contributing to ambient lighting in the theater and reducing contrast on the screen. This also reduces the audience's feeling of being somewhere else, and reduces illumination cost (bulb, laser, wattage, etc.).

In various embodiments, the structures on the screen comprise various coatings comprising one or more of, for example, diffusing materials, reflectors, polarizers, prisms, spherical structures, beads, liquid encapsulated beads, crystals, liquid crystals, micro-dots, quantum dots, materials exhibiting Brownian motion, materials that are flexible and react (move) to vibrations such as high frequency sound or physical vibrations, materials that exhibit random motion when vibrated introduced to sonic waves, polarization preserving materials.

The structures on the screen are generally of a size smaller than a pixel displayed on the screen. For example, the structures may be any of just less than a pixel size, ½ a pixel, ¼ of a pixel, or an order of magnitude or more smaller than a pixel size. All other factors being equal, a screen showing a 4 k or 8 k images would have structures that are respectively 2× or 4× smaller than the structures on a screen showing 2 k images. For compatibility across all typical images 2 k-8 k, smaller structures sizes are more desirable.

The various structures may be etched or embossed onto a screen material. The various materials or coatings may include structures randomly or evenly mixed into a clear or translucent medium such as, for example, paint, acrylic, or epoxy, and sprayed onto a screen substrate. Such substrates may be, for example, plastic, PVC, polymers. The substrate may have, for example, a high modulus compared to ordinary cinema screens currently in use, which may be helpful when used in combination with screen shaking to reduce speckle.

The structures and/or coating over structures can be embossed using a roller with unique start to finish pattern. They may be, for example:

a. Done vertically on a 10 m tall screen would mean a 10 m circumference roller or 3.2 m in diameter.
b. Could use vertical seaming for smaller unique rollers, or use multiple unique rollers on the same substrate
c. Done horizontally on a 20 m wide screen would mean a 20 m circumference roller or 6.4 m in diameter.
d. Could use horizontal seaming for smaller unique rollers, or use multiple unique rollers on the same substrate.
e. Could use for example 15 unique rollers to emboss one screen as a single substrate or multiple substrates seamed together. Table 1 below shows 15 unique rollers and their coverage of a screen (e.g., each roller primarily applied to a section of the corresponding to the physical location of the roller ID number in Table 1).

TABLE 1

| 01 | 02 | 03 | 04 | 05 |
| 06 | 07 | 08 | 09 | 10 |
| 11 | 12 | 13 | 14 | 15 |

Each roller may have, for example, a different structure of the roller material. The roller structure is, for example, inverse to the structure to be applied to the screen. The roller may, for example, be applied to sections of substrates which are then welded (e.g., plastic welding) or otherwise seamed together. The sections of substrate may be overlapped such that an amount of mixing occurs between different sections as the screen transitions between adjacent sections.

Roller 1's structure may be for example, primarily applying a structure that causes reflectivity of the screen primarily down and inward (mainly away from walls of the theater). The inward reflectivity is shown, for example, in FIG. 7—darker reflection arrows emanating from edges of the illustrated screen. Roller 15 may be primarily up and inward, the inward component also illustrated by the darker reflection arrows of FIG. 7. Roller 8 may, for example, have a structure that more evenly distributes reflected light as, for example, illustrated by the central reflections from the screen in FIG. 7. Reflectivity pattern such as those illustrated and/or described herein with reference to FIGS. 5A-5D, 6, and elsewhere may also be implemented.

The rollers may be run over the substrates when heated and in a malleable state, and then cooled or otherwise cured to cause the structures on the screen to be formed. A base material may be applied to the substrates before rolling, such as a curable liquid or paste, acrylic, epoxy, etc. The base material may include, for example, particles, optical particles, and/or other materials as described elsewhere herein, etc., that together with the base material as a whole, when cured, form the structures on the substrate.

In one embodiment, the rollers include orifices in which a base material that may include optical particles is exuded onto the roller during the rolling process. As the roller traverses the screen (substrate), the composition of the base material may be varied to correspond to the optical qualities that are desirable for a corresponding location of the screen. To provides a smooth variation between areas of the screen with different optical properties rollers may be changed and/or double rolling some portions of the substrate/screen (e.g., transitional areas between sections) first with a roller of one section and then with the roller from an adjacent section. Pressure applied to the roller may be reduced as the roller approaches the edge of its corresponding section. An adjacent section roller may begin in a transitional area between sections with a light pressure which is increased to full normal pressure outside the transitional area and fully within its corresponding section.

The structures may be etched into or printed onto a substrate via a Computer Numerical Controlled (CNC) machine, such as a large sized CNC routing table with a fine cutting or printing instrument. Small sized (e.g., micro) 3D printing may be utilized to produce the structures.

The structures may be coated with various materials for various purposes, such as to improve any of speckle reduction, diffusion or specularity. The coating may also include structures, such as crystals (e.g., liquid crystals), small particles of opaque, transparent, or translucent materials. A coating may be of an acrylic or paint like mixture of transparent or translucent material including the additional structures. The coating may be sprayed onto the screen and cured. Curing may be from air contact, irradiation with light (e.g., UV, or IR (heat)), or other cure processes depending on the coating materials.

The coating may include pigments or filter materials. The coating may comprise a spectral coating designed to vary refection based on wavelength to reduce reflectance of non-projected light to reduce effect of ambient light on screen image contrast. In one embodiment, the coating comprises a pigmented material highly reflective of wavelengths of light emitted by the projector (e.g., red, green, and blue laser wavelengths) and less reflective of other wavelengths. The reflective sensitivity of the screen is preferably tuned to at least 6 primary wavelengths corresponding to wide color gamut primaries of a laser projector and/or 1st (R1G1B1) and 2nd (R2G2B2) channels of a spectrally separated 3D images (e.g., 2 sets of RGB lasers).

In some embodiments, the reflectors (and any coatings) are polarization preserving, and the screen surface comprises a polarization preserving surface. Such embodiments are compatible with conventional and laser illuminated polarization based 3D projection systems (e.g., z-screen implementations, dual projector left right orthogonally polarized projections, etc.).

The reflectivity may be tuned for a specific geometry or projection angle. The tuning may be provided across the screen such that one area of the screen may be tuned slightly or dramatically different from other areas.

The design parameters to build engineered structured screens for down angled illumination (i.e. auditoriums with stadium seating) are now discussed. The structure such that it is optimized for 10 degree (or other angles corresponding to the angle of projection) down angled illumination (this is concept A). The structure would bias the distribution of the reflected light downward toward the audience with the assumption that it is arriving at the screen 10 degrees off the normal.

Figure 6:
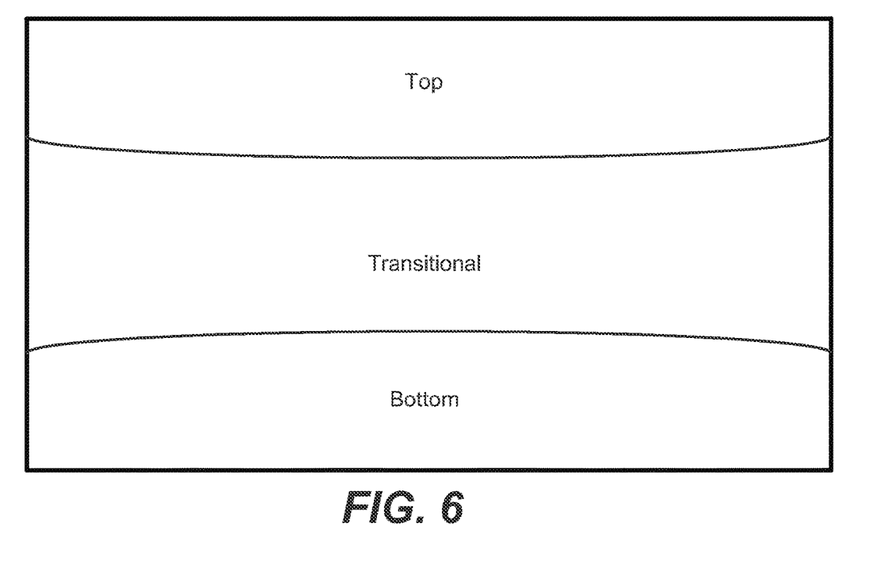
FIG. 6 is a map of main reflective areas of a screen.

The structure of the screen varies from the top to the bottom of the screen as illustrated, for example, in FIG. 6 (This is concept B):

a. The top would be designed to take illumination assumed normal (or +/− a few degrees off normal depending on application) to its surface and bias its distribution down toward the audience with almost no reflection up from the normal.

b. The bottom would be designed to take illumination assumed to be at a 20 degree down angle (+/− a few degrees depending on application) to its surface and bias its distribution up toward the audience with almost no reflection down.

c. The rest of the screen would be designed to transition between the top and bottom parameters. Going from top to bottom the assumed angle of down angled projection would increase. Going from top to bottom the reflectance would bias from down to up with the center biasing light equally up and down.

The design parameters should be of qualities independently and/or along with the engineered structured screen to reduce speckle (This is concept C). This includes, for example, choosing a substrate which once embossed and coated provides enhanced transmission of the surface disruptions caused by the screen vibrators. This may be provided, for example, with a PVC substrate (e.g., perforated) coated with speckle reduction material or material that reacts in combination with screen shaking (e.g., mechanical or sonic vibrations) to reduce speckle.

The embossing structure and/or coating itself is chosen for properties that reduce audience perceived speckle (This is concept D). The design parameters and concepts can be combined in any combination. Some exemplary combinations include concepts AC, AD, ACD, BC, BD, BCD and CD to produce screens which provide multiple benefits.

In one embodiment, use of designed (extremely low) screen gain at high angles can improve the contrast ratio for curved screens. The idea is to get to the edges of the screen the structure is designed to take the light (which will be coming in at steeper horizontal angles) and direct it not only more toward the audience but more importantly away from the walls to prevent reflections back to the screen which reduces contrast. It is equally if not more important to keep the light off the ceiling, so the top vertical structure would need to take that into account in its specification. For example, in FIG. 5A, the top area directs mainly down (away from the ceiling), the side areas direct mainly in (and away from walls). Floor reflections should similarly be minimized. Also the screen structure can be such that it is designed to perform well when curved. A good screen curvature may be, for example, 20:1 and the horizontal structuring of the screen should be designed taking the curvature into account to get more light on the audience and to keep light off the walls. For example, the structures are designed so that the reflections emanate in the desired direction when the screen is curved, which is different when the screen is flat. For example, all other factors being equal, compared to a flat screen, a screen with a 20:1 horizontal curvature would have reflectors angled an amount in proportion to the screen curvature at the location of the reflectors. The structures in such reflectors take into account the screen curvature as shown.

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. For example, when describing a reflector, any other equivalent device, such as appropriately configured mirrors, prisms, glass or silicates (e.g., crushed silicate) or other devices or materials having similar or equivalent function or capability, whether or not listed herein, may be substituted therewith. Furthermore, the inventors recognize that newly developed technologies not now known may also be substituted for the described parts and still not depart from the scope of the present invention. All other described items, including, but not limited to structures, coatings, substrates, projectors, seating arrangements, etc. should also be considered in light of any and all available equivalents.

The present invention may suitably comprise, consist of, or consist essentially of, any of element (the various parts or features of the invention, e.g., [list parts/components]) and their equivalents as described herein. Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of the appended claims, the invention may be practiced otherwise than as specifically described herein.

The invention claimed is:

1. A cinema screen comprising structures which are spaced apart and are configured to direct light projected onto the screen toward an audience and away from side walls, ceilings, and floors of a theater,
   wherein the structures have respective angles of inclination relative to screen normal that vary over the screen,
   wherein the spacing between the structures varies over the screen such that separation distance increases with an increase in angle of inclination,
   wherein the structures have geometric properties that vary across the screen, and
   wherein the geometry of the structures increases towards edges of the screen in a manner that causes more light reflected from the edges of the screen to be directed away from a wall of the theater and toward an audience.

2. The cinema screen according to claim 1, wherein the structures vary in at least one of geometry, reflection angle, and spacing across the cinema screen smoothly.

3. The cinema screen according to claim 1, wherein the screen is designed to reflect light projected onto the screen at a down angle, and screen areas where the light has a smaller down angle contain more structures which direct the light with the smaller down angle toward a center of the audience, and screen areas where the light has a larger down angle contain more structures which direct the light with the larger down angle toward the center of the audience.

4. A cinema screen comprising structures which are spaced apart and are configured to direct light projected onto the screen toward an audience and away from side walls, ceilings, and floors of a theater,
   wherein the structures have respective angles of inclination relative to screen normal that vary over the screen,
   wherein the spacing between the structures varies over the screen such that separation distance increases with an increase in angle of inclination,
   wherein the screen is designed for an approximately 10 degree down angle projection, and
   wherein a top of the screen contains more structures that reflect mainly in a down direction, a bottom of the screen contains structures that reflect mainly in an upward direction, and edges of the screen that reflect mainly inward and toward an audience.

* * * * *